May 7, 1935.  O. M. MÜLLER  2,000,783
ADJUSTABLE GAUGE
Filed Nov. 27, 1933
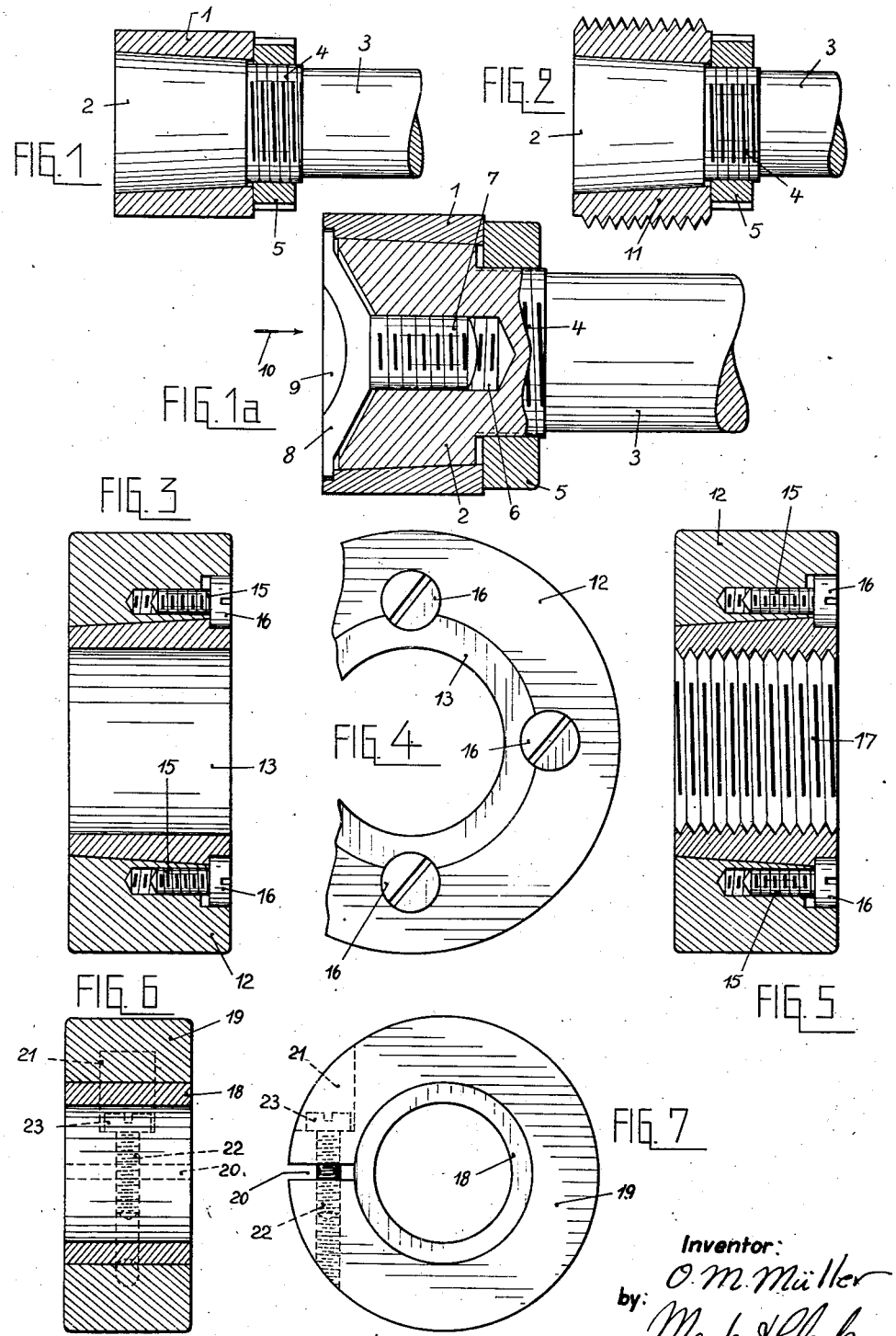

Patented May 7, 1935

2,000,783

UNITED STATES PATENT OFFICE 2,000,783

ADJUSTABLE GAUGE

Otto Max Müller, Berlin-Lichterfelde, Germany
Application November 27, 1933, Serial No. 700,010
In Germany November 17, 1930

11 Claims. (Cl. 33—178)

My invention relates to adjustable gauges which may be of the plug or ring type, and may be used for gauging plain or threaded parts.

It is an object of my invention to provide a gauge of the type referred to which has longer life than the similar gauges as designed at present.

Plug and ring gauges for plain or threaded parts are usually made of hardened steel, and finished to extremely fine limits so that they are rather expensive. On the other hand, in view of the very exacting conditions of up-to-date manufacture, wear of the gauges, even if only of the order of .001 millimeter, or even less, is not permitted and worn gauges must be exchanged, involving heavy cost to the manufacturer.

My novel gauge comprises an annular gauging member and a member for varying the gauging diameter of the gauging member. The last-mentioned member which will be referred to as the "support" for the annular gauging member, may be a plug or a collar. A gauge with a collar as the support is described in the U. S. patent to Peterson, 1,487,803, March 25, 1924. This gauge, however, has a split annular gauging member which is deformed by the variation of its gauging diameter so that the gauging face of the member departs from the exactly cylindrical form required, and the gauge cannot be used for exact gauging. In the case of a ring gauge, the gauging diameter is reduced and in the case of a plug gauge it is increased by means of the support, but in both cases the gauging surface of the annular member is deformed and becomes irregular.

The problem of prolonging the life of a plug or ring gauge by making it adjustable, cannot be solved if the gauging member is split.

Therefore, with the object of providing an adjustable gauge whose gauging surface does not become irregular by adjusting the gauge, and whose life is practically unlimited as it can be adjusted as often as required, I use a continuous or undivided annular gauging member, like a plain ring gauge which, as it is without any slots or the like, remains truly cylindrical when deformed for adjusting the gauge.

In ring gauges for threads, it has already been proposed to provide a continuous annular gauging member, as described in the German patent to Schwerdtfeger, 353,674, January 11, 1921, in combination with a pair of annular members for varying the gauging diameter of the member. The said annular members, however, bear on the gauging member only locally and at both ends of the member, with the object of making up for the increase of inside diameter which is produced in the gauging member at its ends by lapping.

I have found that in order to provide a gauge in which irregularities of the gauging surface are absolutely prevented, it is necessary that, firstly, the gauging member should be continuous, as stated, and that, secondly, the gauging member and the support should engage each other by seating faces whose length is equal to the length of one of the members, i. e., the seating faces may be as long as the annular member, or as long as the support so that the gauging member and the support engage each other throughout, and not locally, as in the said German patent.

Just as in the old gauges referred to, deformation of an annular gauging member is relied on in my novel gauge and such deformation is practicable even if the member is continuous, and made of hardened steel. By using an undivided gauging member and by providing the long seating faces as described, I obtain a uniform and regular variation of the gauging member throughout its length by deforming it.

The deformation is effected by relative displacement of the annular gauging member and the support. The relative displacement may be axial or radial. For instance, the seating face of the gauging member which is on the side opposite its gauging face, may be tapered and cooperate with a corresponding tapered face on the support. The tapered seating faces of the gauging member and the support exert a wedging action on each other when the support is shifted axially with respect to the gauging member, and the axial displacement results in a variation of the gauging diameter of the member.

The support may be a solid block which penetrates into the annular gauging member, or, conversely, it may be a collar in which the annular member is inserted. The support may be divided or it may be built up from several parts so that its diameter can be varied. There is no difficulty about dividing the support because the support is not the gauging member and so a slight irregularity of its diameter is without influence.

In the accompanying drawing, plug and ring gauges embodying my invention are illustrated diagrammatically by way of example.

In the drawing

Fig. 1 is an axial section of a plain plug gauge,

Fig. 1a is an axial section of a modified plug gauge,

Fig. 2 is an axial section of a plug gauge for threads,

Fig. 3 is an axial section, and

Fig. 4 is an end elevation, viewed from the right in Fig. 3, of a plain ring gauge with a continuous collar, Fig. 5 is an axial section of a ring gauge as shown in Figs. 3 and 4, for threads, Fig. 6 is an axial section, and Fig. 7 is an end elevation, viewed from the left in Fig. 6, of a plain ring gauge with a split collar.

Referring now to the drawing, and first to Fig. 1, the gauging member 1 is annular, with a cylindrical outer gauging face, and a tapered inner seating face. The seating face bears on a tapered support 2 whose seating face is substantially as long as the seating face of member 1. A parallel extension or handle 3 is connected to the small end of the support 2 with which it may be integral as shown, and a threaded portion 4 is arranged between the handle 3 and the small end of the support 2, with a nut 5 on the thread which bears against the inner end of the gauging member 1. Both the gauging member 1 and the support 2 are continuous, and the member 1 is shifted axially on the support 2 by turning the nut 5. The annular gauging member 1 is extended more or less by such shifting while the material of the member is expanded, and the gauging diameter of the annular member 1 is varied in conformity. The variation is regular because the annular member 1 is continuous, and therefore its gauging face remains a true cylinder for all diameters. The gauge is adjusted exactly for the required gauging diameter, and wear is made up for, by turning the nut 5.

Referring now to Fig. 1a, this plug gauge is designed as the one illustrated in Fig. 1 but its support has a central threaded bore 6 in which is inserted a screw 7. When the gauge has been adjusted, the screw 7 is inserted and screwed home until a disk 8 at the outer end of the screw enters a recess in the outer end of the gauging member 1, as shown. The screw may have a slot 9 for a screw driver to engage in.

The screw 7 and its disk 8 are provided for the following purpose: If the gauge seizes in the hole to be gauged and is forced out of the hole by striking the support 2 in the direction of arrow 10, it may happen that the support is forced out of the gauging member 1. This is prevented by the screw 7 and its disk 8 which connects the gauging member and the support.

The plug gauge illustrated in Fig. 2 is quite similar to the one illustrated in Fig. 1 but has a threaded gauging member 11 instead of a plain one.

Referring now to Figs. 3 and 4, this ring gauge has a continuous collar 12 in which is inserted a gauging member 13. The gauging member 13 is continuous, like the member 1, and is similar to the member 1, except for the fact that its inner face is the cylindrical gauging face, and its outer face is the tapered seating face which fits in a tapered bore of the collar 12. The gauging diameter of the gauging member 13—which here is its inside diameter—is varied by means of four screws 15 whose heads 16 are inserted in recesses of the end of collar 12 and bear on recessed portions of the gauging member 13.

A similar gauge, for a threaded gauging member 17, is illustrated in Fig. 5.

Figs. 6 and 7 illustrate a gauge for radial relative displacement. The gauging member 18 has parallel and cylindrical outer and inner faces and is inserted in a collar 19 which is split at 20, with its outer seating face, the inner face being the gauging face. The outer seating face of the undivided gauging member 18 fits in a parallel bore of the collar 19. A screw 22 is provided for connecting the portions of the collar 19 which are at opposite sides of its split portion 20, and the head 23 of the screw 22 is housed in a recess 21 of the collar 19. By turning the screw 22, the inside diameter of the parallel seat for the continuous gauging member 18 and the inside diameter of the gauging face of the member are reduced.

It is understood that means for effecting relative radial displacement of the two members, the gauging member and the support, are not limited to ring gauges, nor are means for effecting relative axial displacement limited to plug gauges.

I claim:

1. In an adjustable gauge, a continuous annular gauging member having a gauging face and a seating face, an adjusting member having a seating face adapted to engage the seating face of said gauging member so as to vary the diameter of said gauging member at its gauging face by relative displacement of said two members, the length of said seating faces being equal to the length of one of said members; and means for effecting relative displacement of said gauging and said adjusting member.

2. In an adjustable gauge, a continuous annular gauging member having a gauging face and a tapered seating face, an adjusting member having a tapered seating face adapted to engage the tapered seating face of said gauging member so as to vary the diameter of said gauging member at its gauging face by relative axial displacement of said two members, the length of said tapered seating faces being equal to the length of one of said members; and means for effecting relative axial displacement of said gauging and said adjusting member.

3. In an adjustable gauge, a continuous annular gauging member having a gauging face and a cylindrical seating face, an adjusting member having a cylindrical seating face adapted to engage the cylindrical seating face of said gauging member so as to vary the diameter of said gauging member at its gauging face by relative radial displacement of said two members, the length of said cylindrical seating faces being equal to the length of one of said members; and means for effecting relative radial displacement of said gauging and said adjusting member.

4. In an adjustable gauge, a continuous annular member having a gauging face and a seating face, as the gauging part of said gauge; a support having a seating face adapted to engage the seating face of said gauging part, as the adjusting part of said gauge; so as to vary the diameter of said gauging part at its gauging face by relative displacement of the gauging and adjusting parts, the length of said seating faces being equal to the length of one of said parts;

and means for effecting relative displacement of said gauging and said adjusting part.

5. In an adjustable gauge, a continuous annular member having a gauging face and a seating face, as the gauging part of said gauge; a support having a seating face adapted to engage the seating face of said gauging part, as the adjusting part of said gauge; so as to vary the diameter of said gauging part at its gauging face by relative displacement of the gauging and adjusting parts, the length of said seating faces being equal to the length of one of said parts; and means for varying the size of said adjusting part, or support, where its seating face engages the seating face of said gauging part, or continuous annular member so as to effect relative displacement of said gauging and said adjusting part.

6. In an adjustable gauge, a continuous annular member having a gauging face and a seating face, as the gauging part of said gauge; a split support having a seating face adapted to engage the seating face of said gauging part, as the adjusting part of said gauge; so as to vary the diameter of said gauging part at its gauging face by relative displacement of the gauging and adjusting parts, the length of said seating faces being equal to the length of one of said parts; and means for varying the width of the split in said adjusting part, or support, so as to effect relative displacement of said gauging and said adjusting part.

7. In an adjustable plug gauge, a continuous annular gauging member which has a gauging face on its outer side and a tapered seating face on its inner side, as the gauging part of said gauge; a support having a tapered seating face adapted to engage the seating face of said gauging part, as the adjusting part of said gauge; so as to vary the diameter of the gauging part at its gauging face by relative axial displacement of the gauging and adjusting parts, the length of said seating faces being equal to the length of one of said parts, an extension of said adjusting part, or support, beyond said gauging part, or continuous annular member, a threaded portion on said extension, and a nut on said portion which bears against one end of said gauging part, or continuous annular member, for effecting relative displacement of said gauging and said adjusting part.

8. In an adjustable plug gauges, a continuous annular gauging member which has a gauging face on its outer side and a tapered seating face on its inner side, as the gauging part of said gauge; a support having a tapered seating face adapted to engage the seating face of said gauging part, as the adjusting part of said gauge; so as to vary the diameter of the gauging part at its gauging face by relative axial displacement of the gauging and adjusting parts, the length of said seating faces being equal to the length of one of said parts, an extension of said adjusting part, or support, beyond said gauging part, or continuous annular member, a threaded portion on said extension, a nut on said portion which bears against one end of said gauging part, or continuous annular member, for effecting relative displacement of said gauging and said adjusting part, and means for holding said gauging and said adjusting part against relative displacement in opposite direction to the thrust exerted by said nut.

9. In an adjustable plug gauge, a continuous annular gauging member which has a gauging face on its outer side and a tapered seating face on its inner side, as the gauging part of said gauge; a support having a tapered seating face adapted to engage the seating face of said gauging part, as the adjusting part of said gauge; so as to vary the diameter of the gauging part at its gauging face by relative axial displacement of the gauging and adjusting parts, the length of said seating faces being equal to the length of one of said parts, an extension of said adjusting part, or support, beyond said gauging part, or continuous annular member, a threaded portion on said extension, a nut on said portion which bears against one end of said gauging part, or continuous annular member, for effecting relative displacement of said gauging and said adjusting part, a screw inserted in a threaded bore of said adjusting part, or support, and a disk on said screw for engaging that end of said gauging part, or continuous annular member which is opposite the end engaged by said nut.

10. In an adjustable plug gauge, a continuous annular gauging member which has a gauging face on its inner side and a tapered seating face on its outer side, as the gauging part of said gauge; a collar having a tapered seating face adapted to engage the seating face of said gauging part, as the adjusting part of said gauge; so as to vary the diameter of the gauging part at its gauging face by relative axial displacement of the gauging and adjusting parts, the length of said seating faces being equal to the length of one of said parts; and means for effecting relative axial displacement of said gauging and said adjusting part.

11. In an adjustable plug gauge, a continuous annular gauging member which has a gauging face on its inner side and a tapered seating face on its outer side, as the gauging part of said gauge; a collar having a tapered seating face adapted to engage the seating face of said gauging part, as the adjusting part of said gauge; so as to vary the diameter of the gauging part at its gauging face by relative axial displacement of the gauging and adjusting parts, the length of said seating faces being equal to the length of one of said parts; and a screw on said adjusting part, or collar, which bears on said gauging part, or continuous annular member, for displacing said gauging part axially with respect to said adjusting part.

OTTO MAX MÜLLER.